(12) United States Patent
de Bruyn et al.

(10) Patent No.: US 11,543,323 B2
(45) Date of Patent: Jan. 3, 2023

(54) LEAK TESTER (71) Applicant: Delta Engineering bvba, Ophasselt (BE)

(72) Inventors: Danny de Bruyn, Ophasselt (BE); Rudy Lemeire, Ophasselt (BE)

(73) Assignee: Delta Engineering bvba, Ophasselt (BE)

( * ) Notice: Subject to any disclaimer, the term of this patent is extended or adjusted under 35 U.S.C. 154(b) by 8 days.

(21) Appl. No.: 17/072,458

(22) Filed: Oct. 16, 2020

(65) Prior Publication Data

US 2021/0116326 A1 Apr. 22, 2021

(30) Foreign Application Priority Data

Oct. 17, 2019 (EP) .................................... 19000475

(51) Int. Cl.
*G01M 3/32* (2006.01)

(52) U.S. Cl.
CPC ........ G01M 3/3218 (2013.01); G01M 3/3236 (2013.01)

(58) Field of Classification Search
CPC ...... G01M 3/00; G01M 3/002; G01M 3/3209; G01M 3/3263; G01M 3/3281; G01M 3/3236; G01M 3/3272; G01M 3/34; G01M 3/007
See application file for complete search history.

(56) References Cited

U.S. PATENT DOCUMENTS

| | | | |
|---|---|---|---|
| 3,495,441 A | 2/1970 | Laub | |
| 3,762,213 A | 10/1973 | Nowicki | |
| 3,847,013 A | 11/1974 | Luy | |
| 3,938,368 A | 2/1976 | Eberle | |
| 4,019,370 A * | 4/1977 | Allocco, Jr. | ........ G01M 3/3218 73/45.1 |
| 5,918,270 A | 6/1999 | Heuft | |
| 6,439,032 B1 | 8/2002 | Lehmann | |
| 7,266,993 B2 | 9/2007 | Strand et al. | |
| 7,559,232 B2 | 7/2009 | Meckl | |

(Continued)

FOREIGN PATENT DOCUMENTS

| | | | |
|---|---|---|---|
| DE | 19721529 A1 * | 11/1997 | .......... G01M 3/3209 |
| DE | 19721529 A1 | 11/1997 | |

*Primary Examiner* — John Fitzgerald
*Assistant Examiner* — Truong D Phan
(74) *Attorney, Agent, or Firm* — Alix, Yale & Ristas, LLP (57) ABSTRACT A method for in-line leak testing of blow moulded containers wherein a conveyor line is fed with a continuous stream of blow moulded containers from a blow moulding machine, at least one measuring head is temporarily connected to a first blow moulded container. The measuring head is moved in order to follow the movement of said first blow moulded container which is pressurized by a source of pressurized gas, the source of pressurized gas is disconnected, said at least one measuring head is used to measure the pressure decay therein. The pressure decay is compared with stored data for the pressure decay of acceptable containers and an accept or non-accept signal is generated which implies proceeding or disposal of said first blow moulded container. The measuring head is moved against the moving direction of the conveyor line to a subsequent blow moulded container, and the process is repeated.

19 Claims, 5 Drawing Sheets

(56) References Cited

U.S. PATENT DOCUMENTS

| | | | |
|---|---|---|---|
| 2003/0230135 A1* | 12/2003 | McCormick | G01M 3/3236 73/49.2 |
| 2005/0109086 A1 | 5/2005 | Duncan et al. | |
| 2008/0072658 A1 | 3/2008 | Meckl | |
| 2014/0115856 A1* | 5/2014 | Lehmann | B65G 17/30 29/407.01 |

* cited by examiner

LEAK TESTER

BACKGROUND

The present disclosure belongs to the technical field of testing of blow moulded containers, and more particularly to the leak testing of blow moulded containers. More particularly, the present disclosure relates to a method for in-line leak testing of blow moulded containers. The present disclosure also concerns a machine for in-line leak testing of blow moulded containers.

Quality control of blow moulded containers such as bottles, jars or canisters is a must in the blow moulding industry. Among others, leak testing is an important part of the quality control. Leaks in containers may on the one hand lead to leaching of contained substance. On the other hand, oxygen can penetrate the protective barrier which a blow moulded container represents for foodstuff or beverage. Presence of oxygen leads to loss of quality and frequently to the total loss of food or beverage products. Leak testing before the container is used in packaging applications is therefore an important task in order to avoid significant economic and ecological loss.

Depending on size and structure of the containers, state-of-the-art blow moulding machines can provide several 10,000 containers per hour. Leak testing should not be a bottle neck and therefore be able to be fed with the production of the blow moulding. In order to do so in-line leak testing has been developed. Such in-line leak tester can take the whole production of a blow moulding machine, if necessary, by splitting the production stream into two or more lines which run in parallel.

The rate of testing is extremely important. Investment costs are high in the blow moulding industry and productivity decides if a production line is profitable or not. The overall measuring time for a container in an in-line leak tester should therefore be as short as possible.

U.S. Pat. No. 7,559,232 B2 discloses a machine for leak testing melt blown bottles including a base plate which is provided with a vacuum. Leak testing is performed by applying vacuum to the bottom area of the bottle. Small leaks and cracks can be detected by comparing the reduced pressure versus time curve of each bottle compared with data obtained from bottles without leaks.

U.S. Pat. No. 3,762,213 A discloses a method and an apparatus for detecting leaks in plastic bottles. The leak detector is sealingly engaged to the mouth of the bottle to be tested. Thereafter, a vacuum is drawn in the bottle. Reduced pressure versus time curve of each bottle is compared with data obtained from bottles without leaks.

U.S. Pat. No. 3,847,013 A describes filled-up and closed containers, such as aerosol cans, which are to be tested for leaks, and which are fed one after another, each into a separate chamber. The chambers are moving and are hermetically sealed along their path between an inlet and an outlet station. A gas sampling station disposed forwardly of the outlet serves to take a gas sample out of each chamber. Gas samples from chambers with leaking containers will show a different sample composition than gas samples from chambers with tight containers.

U.S. 3,938,368 A discloses leak testing of batteries which are moved along a first roller type conveyor to a leak testing station, above which is located an assembly having a plurality of nozzles matable over battery cell inlets. A first set of alternate cells is supplied with air at a given pressure, and metering means notes pressure changes. Thereupon, the remaining alternate cells receive the same treatment. If the cells do not leak, the battery advances from the testing station along the roller conveyor. If a leak is detected, a push bar connected to cable means below the rollers ejects the battery transversely from the testing station along to a second conveyor, thereby isolating leaky batteries either for removal or further testing to more precisely locate the leak.

EP 1320738 A2 discloses a method for leak testing closed containers with at least one flexible wall area, by moving a biasing member relatively to said wall area and measuring and monitoring a biasing force on said container. Containers with leaks will provide different measured biasing forces than containers without leaks.

US 2008072658 A1 discloses a machine for leak testing melt blown bottles including a base plate which is provided with a vacuum. Leak testing is performed by applying vacuum to the bottom area of the bottle. Small leaks and cracks can be detected by comparing the reduced pressure versus time curve of each bottle compared with data obtained from bottles without leaks. The machine also includes a turntable assembly which makes in-line testing feasible.

WO 2004083800 A1 discloses an in-line leak tester apparatus for detecting leaks in packages having a flexible cover such as contact lens packages. The flexible covers move in contact with an electromechanical switch when the atmospheric pressure surrounding the package is lowered.

U.S. 7,266,993 B2 discloses a portable apparatus and method for pneumatic testing of blow-molded containers with a top opening. The bottle sides are not touched during testing, the only contact between the apparatus and the containers is with a top surface of each of the containers.

DE 19721529 A1 describes an apparatus and a method for leak testing of blow-moulded bottles or containers. The bottles or containers are after moulding kept and moved in an auxiliary mould, and leak tested during the movement. Auxiliary moulds with space for two or more bottles with fixed distance to each other are feasible.

US 2003230135 A1 discloses a method and an apparatus for leak testing of moulded plastic containers. The containers are conveyed with fixed distances along a path, pressurized by using a source of pressurized fluid, sealed and leak tested.

DE 19524844 A1 discloses a method and an apparatus for leak testing of containers by lowering the pressure in the container in relation to ambient pressure outside the container. The containers are transported by a moving rubber tape which is sucked into the opening of the container. Containers with leaks fall off the rubber tape due to a pressure increase inside the container.

U.S. Pat. No. 3,495,441 A describes an apparatus for pressure testing plastic containers with a plurality of test stations to which the containers are transported by conveyors. The containers are aligned into fixed distances before arriving at the test stations.

Different methods for leak testing are known. Methods and machines for continuous leak testing of different items, including blow moulded products are known. However, none of the cited documents discloses methods or machines which allow continuous leak testing which is fast enough to be fed with the output of a blow moulding machine.

There is a need to provide methods and machine for fast and continuous leak testing of blow moulded containers.

SUMMARY

The disclosure provides a method for fast and accurate in-line leak testing of blow moulded containers. The disclosure further provides a machine for fast and accurate in-line leak testing of blow moulded containers.

Also provided is a machine for fast and accurate in-line leak testing of blow moulded containers.

With "continuous stream" as used herein is understood that the supply is basically uninterrupted, but that variations in the space between the containers for practical reasons may and will occur.

The disclosure provides a method to perform in-line leak testing of blow moulded containers which are moving on a conveyor line. The conveyor line is fed with a continuous stream of blow moulded containers from a blow moulding machine. The conveyor line is equipped with an incremental encoder. When the moving container passes a laser trigger photocell, the actual conveyor position is registered for that container. When said container reaches the measuring head idle position of the measuring head, the container and the movement of the measuring head are synchronized in order to start a measuring cycle. The measuring head is temporarily tightly connected to a first blow moulded container and moved in order to follow the movement of the first container which thereafter is pressurized by a source of pressurized gas, The source of pressurized gas is disconnected and the measuring head is used to measure the pressure decay in the first blow moulded container while following the movement of that container. In the next step the measured pressure decay is compared with stored data for the pressure decay of acceptable containers and an accept or non-accept signal is generated.

In some embodiments, a number of measuring heads are arranged in a group comprising two, three, four or more measuring heads, moving in unison or together to test two, three, four or more blow moulded containers simultaneously.

Accepted containers proceed on the conveyor belt, rejected containers are disposed. According to exemplary embodiments the measuring head is thereafter moved against the moving direction of the conveyor line to a subsequent blow moulded container, is tightly connected to said subsequent blow moulded container, is moved in order to follow the movement of said subsequent blow moulded container and is used to perform in-line leak testing of said subsequent blow moulded container and to generate an accept or non-accept signal for said subsequent blow moulded container.

In one embodiment, the measuring head is moved to an idle position before it is moved again and tightly connected to the subsequent blow moulded container.

If time allows it, the measuring head is moved to the entry point of the containers before connecting to another (subsequent) container to initiate another measurement. In general, typically the measuring heads are moved as close to the entry point as time allows before connecting to subsequent containers for new measurements. Herein is inherently understood that when a series of containers reaches the entry point with no interruptions or extra space between any two containers, the measurements may commence at any point downstream of the entry point as long as there is still sufficient area left to perform a measurement satisfactorily. On the other hand, when an interruption or extra space between two containers occur, the measuring head of heads will again have time to move all the way back to the entry point and start new measurements from there.

In another embodiment, the idle position is located close to the entry point of the fed containers.

BRIEF DESCRIPTION OF THE DRAWINGS

Below, the present invention is described in form of a few non-limiting embodiments illustrated by figures, in which.

DETAILED DESCRIPTION

The terms "right", "left", "right-most" and "left-most" as used herein, are only in relation to the drawings, not intended to be general statements.

Figure 1A:
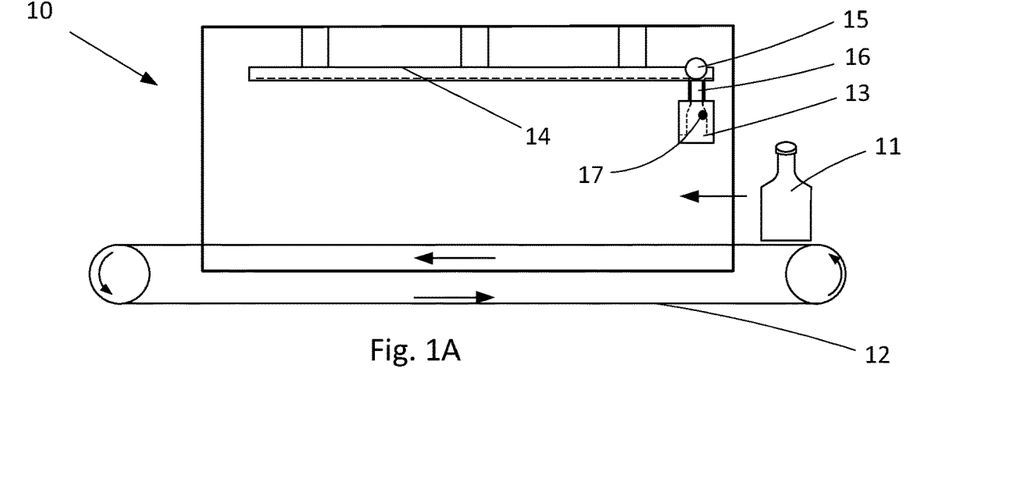
FIGS. 1A-1G show schematically a side view of a leak-testing station with one measuring head in a number of situations, chronologically arranged.

FIG. 1A shows a schematic side view of a device according to the disclosure in the form of a leak-testing station 10. A container 11 is about to enter the leak-testing station 10 on a conveyor belt 12. A measuring head 13 with connections to a source of pressurized gas (not shown) is suspended from a rail 14 via a carrier wheel 15 and a connection arm 16 which is shown as telescopic but may have any functional configuration. A pressure sensor 17 is arranged within the measuring head 13; it may as an alternative be arranged outside the measuring head 13 but in fluid connection therewith. The container is visualized as a bottle, but can have other forms as long as it exhibits an opening accessible from above. The only contact areas between the leak-testing station and the container are on the top between measuring head and container and at the bottom between conveyor belt and container. The side walls of the container are not touched in order to avoid scratches and similar defects. The connection between the connection arm 16 and the rail 14 can also have any functional configuration.

As shown in FIG. 1, the pressure head is in an idle or stand by position, i.e. to the far right in the drawing and slightly elevated (telescope retracted) so as to allow the container to move into a position below the pressure head without bumping into it.

While not shown, the far right point of the conveyer belt is in communication with an upstream conveyer belt or the like feeding containers to the test station 10.

Figure 1B:
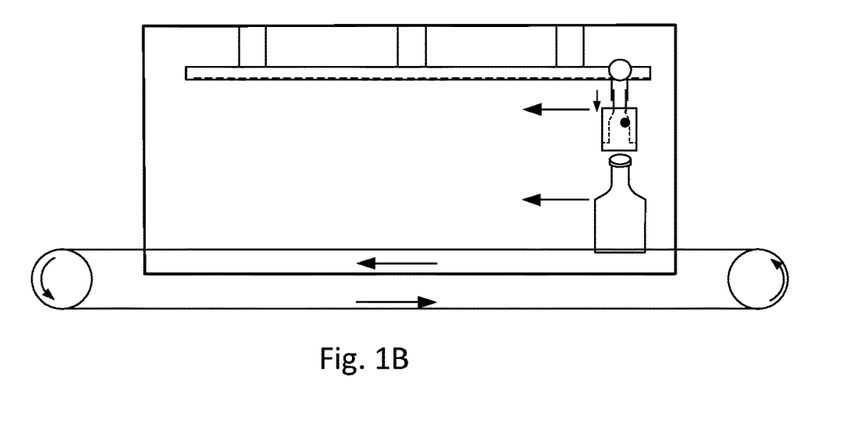

In FIG. 1B the container has moved to a position within the testing station, has been detected and the pressure head has initiated a movement in the same direction with the same approximate speed and initiated a lowering of the head towards the opening at the container top. The small vertical arrow indicates that the measuring head is moving downwards.

Figure 1C:
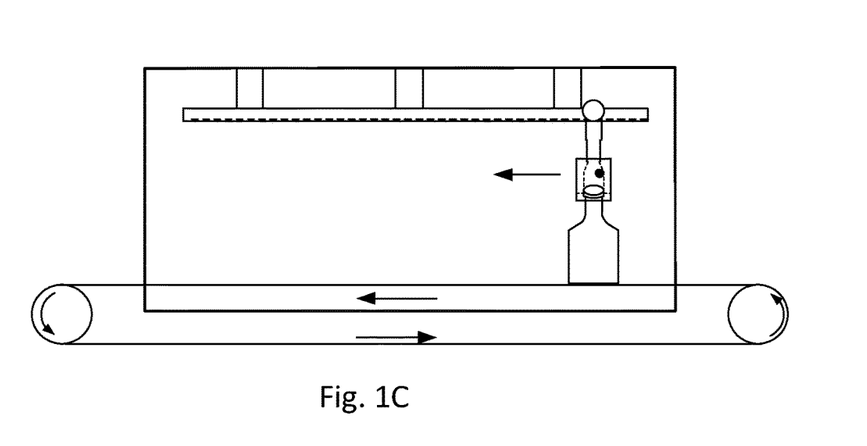

In FIG. 1C the measuring head is tightly connected to the opening of the container and at this point the container is immediately filled with air or other gas from a pressurized source thereof, via the measuring head to a predetermined pressure.

Figure 1D:
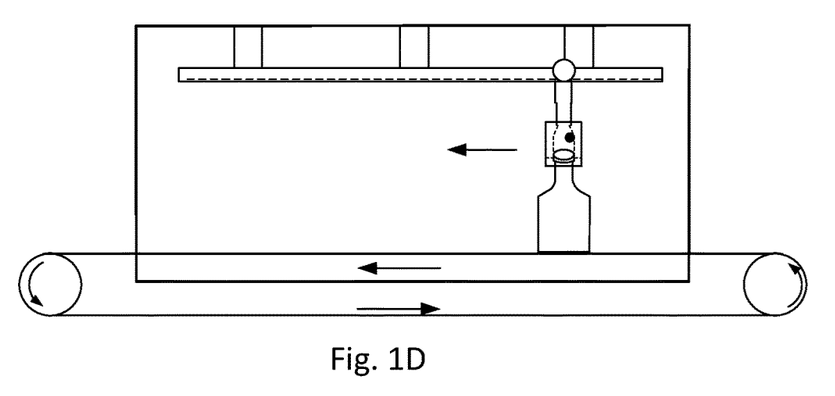

In FIG. 1D, the pressure source has been disconnected and the measurement of pressure decay is initiated. As indicated by the comparatively short distance travelled from the position of the container in FIG. 1C, the pressurizing of the container is a quick operation. In fact, it may be even quicker than visualized by FIGS. 1C and 1D.

Figure 1E:
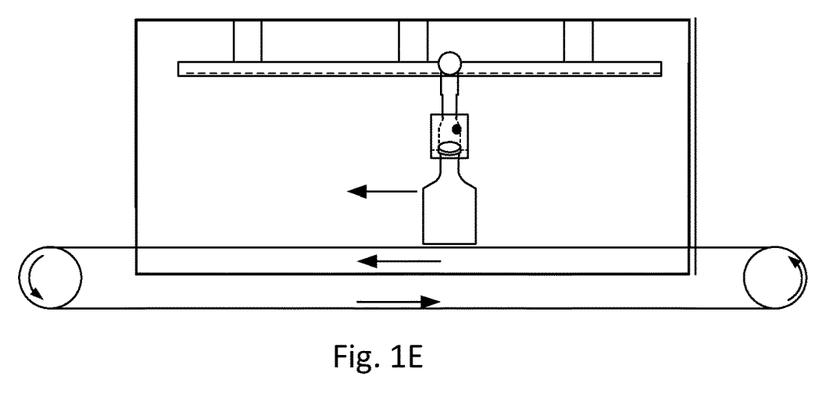

FIG. 1E shows the point at which the measurement is to be terminated. As shown, the leak-testing station has a width that is more than sufficient for measurements that are initiated at the entry point of the containers, which is beneficial for reasons explained below.

Figure 1F:
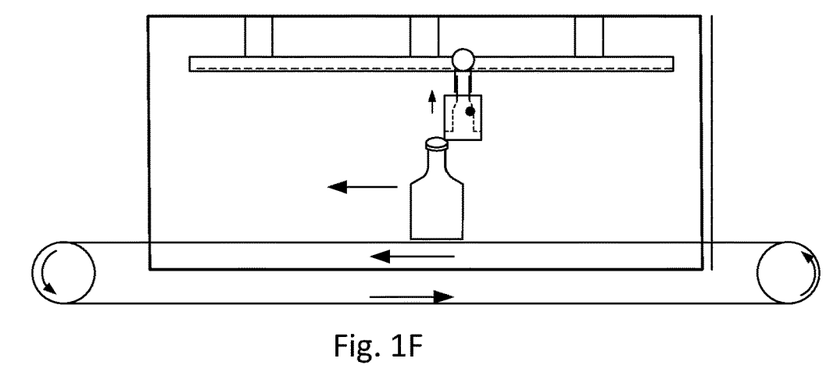

FIG. 1F shows that the measuring head has been disconnected from the container and is no longer moving away from the entry point while the container naturally continues to the left.

Figure 1G:
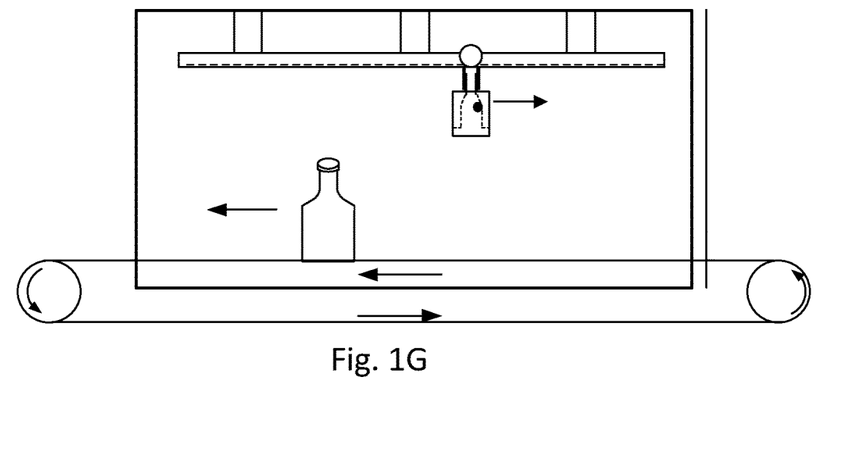

FIG. 1G shows the measuring head returning back to the entry point or idle position, which it can safely do since in this particular case no further container is about to enter the leak-testing station.

Figure 2A:
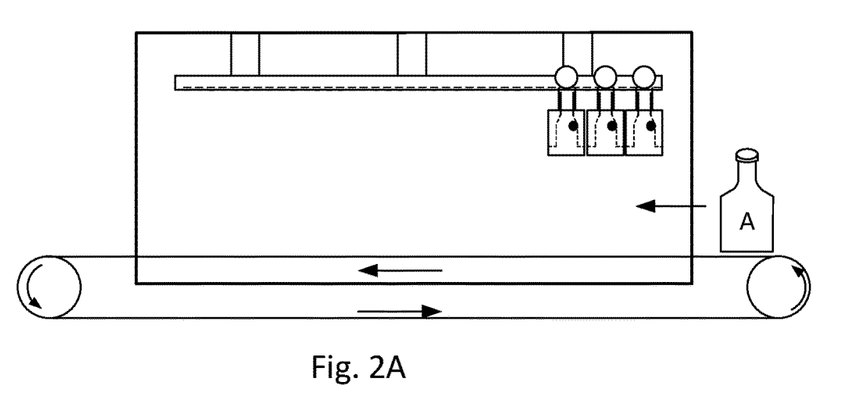
FIGS. 2A-E show schematically a side view of a leak-testing station with three measuring heads in a number of situations, chronologically arranged.

FIG. 2A shows an embodiment of a leak-testing station according to the disclosure comprising three measuring heads 13, all parked at the entry point. A container A is about to enter the station.

Figure 2B:
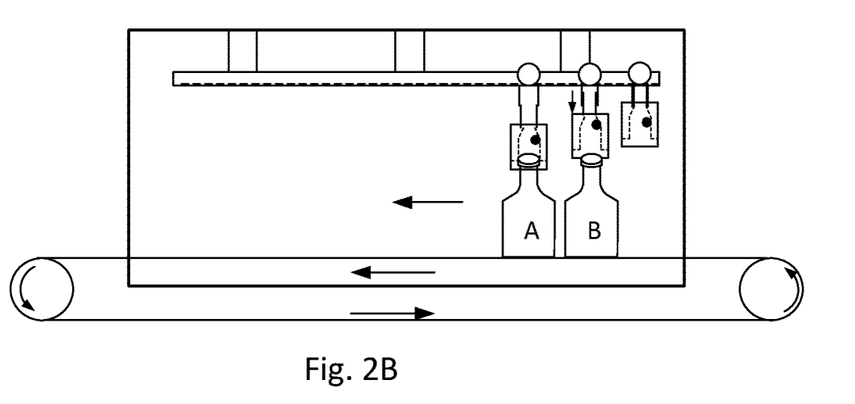

In FIG. 2B, a moment later, two containers A, B have entered the leak-testing station, A being tightly connected to the left-most measuring head and in the process of being pressurized, B about to be connected to the second measuring head while the third measuring head is still idle.

Figure 2C:
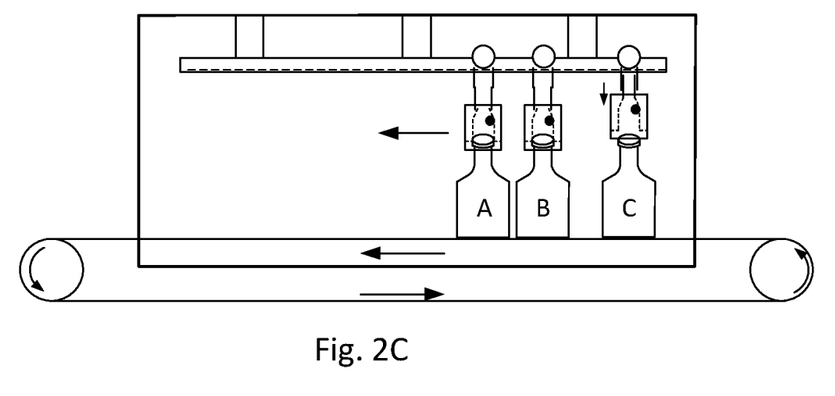

In FIG. 2C a third bottle C has entered the leak-testing station and is about to be connected to the third measuring head. As shown, the distance between container B and C is larger than the distance between container A and B, reflecting a small "interruption" in the feed of containers and the third measuring head has been adapted to this increased distance. In the meantime, measurement is being performed on container A while container B has been pressurized.

Figure 2D:
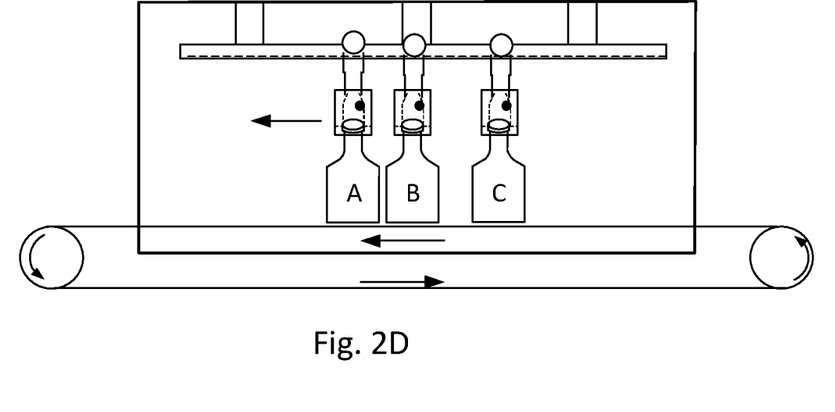

As shown by FIG. 2D, container A has reached a position similar beyond that at which the measurement was terminated in the embodiment of FIG. 1 (FIG. 1E). However, since the measuring head connected to container A cannot return before also the measurements of containers B and C are completed. There is therefore an option to continue to measure pressure drop in container A as well, an option that is sensible to use to the extent that added measuring time also will contribute to added certainty of the measurement and the conclusion on accepting or rejecting the container.

Figure 2E:
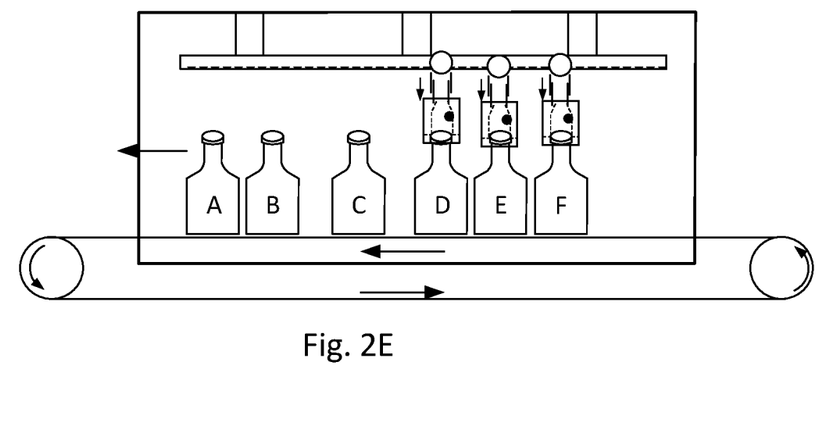

FIG. 2E shows a situation in which three subsequent containers D, E, F follows containers A, B, C so close that the measuring heads do not have the time to move all the way back to the entry point, but initiate the process at the point illustrated, all three heads moving down to connect the point shown, a distance from the entry point.

If even additional containers arrive without interruption, a situation may occur in which the point at which the measurement can be initiated, is so far from the entry point and so close to the discharge point from the leak-testing station 10 that the time for measurement becomes critically small. If or when that occurs, the speed of the conveyer belt 12 may be automatically reduced to allow sufficient time for measurement. When an interruption occurs, and the measuring heads again have the time to move back to the entry point, the speed can again be raised to normal.

Figure 3A:
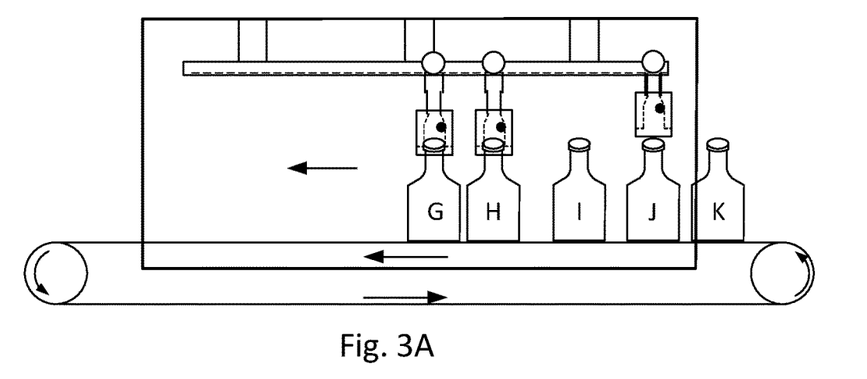
FIGS. 3A and 3B show schematically a side view of a specific feature of the leak-testing station shown in FIG. 2.
Figure 3B:
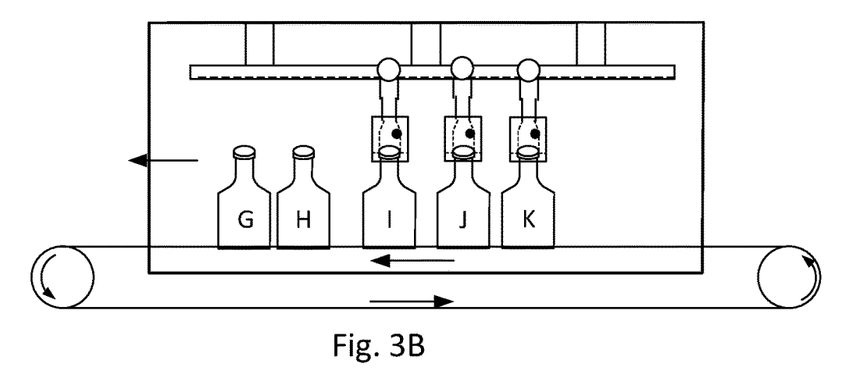

Now referring to FIGS. 3A and 3B, if containers arrive in a certain pattern, it may be more convenient to let the right-most measuring head rest in the idle position even when there is a container on the conveyor belt which could be tested by that measuring head, due to the fact that it is more sensible use of the resources to be able to return the other heads earlier, and instead let the left-most measuring heads test the container in question as the first one of the next cycle of movement. This is illustrated by FIG. 3A in the sense that container I is not tested by the right-most measuring head even if it could. Instead, when the testing is done on containers G and H, all the two measuring heads performing the testing on containers G and H returns and all three measuring heads go into action to test containers I, J and K simultaneously.

Figure 4:
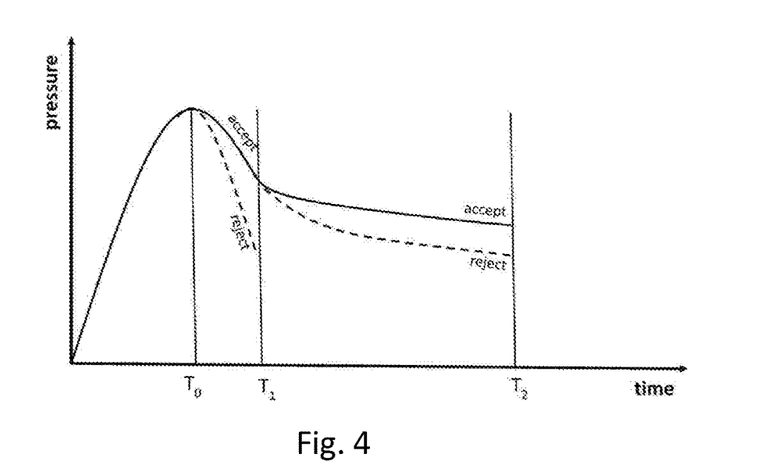
FIG. 4 shows a diagram illustrating functionality of the embodiments.

FIG. 4 shows a typical pressure versus time curve for leak testing by connecting a blow moulded container to a measuring head and a source of pressurized gas. A maximum pressure is reached at $T_0$. After the source of pressurized gas is disconnected a pressure decay occurs until $T_1$ is reached. The straight line shows the pressure decay of a container which can still be acceptable at $T_1$. Pressure decay is caused by delayed volume increase of the bottle (plastic deformation) and/or unavoidable pressure loss between measuring head and container. The interrupted line shows the pressure decay of a container which has to be rejected already at $T_1$ due significant leakage of pressurized gas. The pressure decay is further measured until $T_2$ is reached. The straight line shows a pressure decay which flattens. The container is accepted. The interrupted line shows an unacceptable pressure drop which does not flatten. This container has to be rejected.

While embodiments of one and three measuring heads are mentioned above, other embodiments are feasible, such as four and even more measuring heads within the same leak-testing station.

In some embodiments, the blow moulded containers have a volume of at least 0.5 L, or at least 2 L or at least 10 L.

In some embodiments, the measuring head is tightly connected to the blow moulded container for less than 3 seconds, or less than 2 seconds or even less than 1 second.

In certain embodiments the rate of leak tested bottles is at least 100 per minute, or at least 600 per minute or at least 1200 per minute.

In some embodiments, the blow moulded containers are fed in a variable sequence on the conveyor line, e.g. due to deviations in the blow moulding machine, in which case the distances between two or more measuring heads are adapted to the actual (random) gaps between the containers.

In some embodiments the position of the group of measuring heads is adapted to block gaps occurring in the sequence of containers on the conveyor line due to batch wise production of the containers. Modern blow moulding machines operate frequently with several blow moulding heads in parallel and feed more or less tight blocks of containers onto the conveyor belt. After such a block of containers there is frequently a gap until the next block of containers is fed onto the conveyor belt.

In particular embodiments, the block gaps occurring in the sequence of containers on the conveyor line are used to move the group of measuring heads against the moving direction of the conveyor line and to move the group of measuring heads close to the idle position or to move the group of measuring heads to the idle position.

In some embodiments, after the accept or non-accept signal is generated, at least one measuring head is moved to and hold at an idle position and the remaining heads are tightly connected to subsequent blow moulded containers. Such a set-up allows a measurement with higher sensitivity compared to the set-up when all measuring heads are tightly connected to blow moulded containers.

In a particular embodiment all measuring heads are tightly connected for a prolonged time period to subsequent blow moulded containers on the conveyor line. This set-up allows to perform a leak testing with higher accuracy compared to when the blow moulded containers are fed in a tight sequence on the conveyor line. Leak testing with higher accuracy reduces the number of false generated non-accept signals.

In some embodiments, the measuring heads in the machine for in-line leak testing of blow moulded containers are connected to a source of pressurized gas wherein the connections can be opened and closed by automatic valves.

It should be emphasized that the drawings are just illustrative for the purpose of the general principles of the exemplary embodiments, and that actual design of the elements shown can deviate significantly from these simple schematic drawings.

The invention claimed is:

1. A method for in-line leak testing of blow moulded containers, the method comprising:
    feeding a conveyor line with a sequence of blow moulded containers from a blow moulding machine, wherein at least one measuring head is temporarily connected for in-line testing to a first blow moulded container, said at least one measuring head is moved in order to follow the movement of said first blow moulded container;
    pressurizing said first blow moulded container by a source of pressurized gas whereafter the source of pressurized gas is disconnected;
    measuring, with said at least one measuring head, a pressure decay in said first blow moulded container while following movement of said first blow moulded container;
    comparing said measured pressure decay with stored data for the pressure decay of acceptable containers and an accept or non-accept signal is generated which implies proceeding or disposal of said first blow moulded container such that the at least one measuring head thereafter is moved against the moving direction of the conveyor line to a subsequent blow moulded container, is connected for in-line testing to said subsequent blow moulded container, is moved in order to follow the movement of said subsequent blow moulded container and is used to perform in-line leak testing of said subsequent blow moulded container and to generate an accept or non-accept signal for said subsequent blow moulded container;
    arranging at least one additional measuring head and said at least one measuring head as a group of measuring heads that are configured to:
        move in unison to simultaneously in-line test respective blow moulded containers of said sequence of the blow moulded containers; and
        adapt a distance between two or more measuring heads of the group of measuring heads to gaps in the sequence of blow moulded containers, said gaps being random gaps or block gaps that occur as a result of batch wise production of the sequence of the blow moulded containers produced by the blow moulding machine.

2. The method according to claim 1, wherein the blow moulded container has a volume of at least 0.5 L.

3. The method according to claim 1, wherein the at least one measuring head is connected for in-line testing to the blow moulded container for less than 3 seconds.

4. The method according to claim 1, wherein the method utilizes a container leak testing rate of at least 100 per minute.

5. The method according to claim 1, wherein the group of measuring heads are configured to move against the moving direction of the conveyor line, or to move close to or to an idle position.

6. The method according to claim 1, further comprising, under a pre-determined time condition related to a discharge point, automatically reducing a speed of the conveyer belt to allow sufficient time for measurement.

7. The method according to claim 1, further comprising, after the accept or non-accept signal is generated, moving the at least one measuring head to an idle position and holding the at least one measuring head at the idle position while other measuring heads of the group of measuring heads remain connected for in-line testing whereby the method employs different sensitivity measurements.

8. The method according to claim 1, wherein the method is configured to test three or more blow moulded containers simultaneously.

9. The method according to claim 1, wherein the blow moulded container has a volume of at least 2 L.

10. The method according to claim 1, wherein the at least one measuring head is connected for in-line testing to the blow moulded container for less than 2 seconds.

11. The method according to claim 1, wherein the method utilizes a container leak testing rate of at least 600 per minute.

12. The method according to claim 1, further comprising moving the at least one measuring head to an idle position before the subsequent blow moulded container is connected for pressure testing.

13. The method according to claim 2, wherein the idle position is located close to an entry point of a leak-testing station having the two or more measuring heads.

14. The method according to claim 1, wherein all of the group of measuring heads are connected for in-line testing for a pre-determined time period sufficient to achieve a predetermined leak testing accuracy.

15. The method according to claim 14, wherein said leak testing accuracy is configured to reduce a number of false generated non-accept signals.

16. A device for in-line leak testing of blow moulded containers comprising:
    a conveyor line configured to be fed with a sequence of blow moulded containers from a blow moulding machine;
    a group of measuring heads arranged to move in parallel with the blow moulded containers;
    at least one measuring head of said group of measuring heads arranged to temporarily connect for in-line testing with a first blow moulded container and movable in order to follow movement of said first blow moulded container, wherein the at least one measuring head is equipped to pressurize the first blow moulded container and to measure the pressure decay in said first blow moulded container while following the movement of said first blow moulded container;
    a control unit equipped to compare the measured pressure decay with stored data for the pressure decay of acceptable containers and to generate an accept or non-accept signal which implies proceeding or disposal of said first blow moulded container wherein the at least one measuring head is equipped to be moved against the moving direction of the conveyor line to a subsequent blow moulded container, connected for in-line testing to the subsequent blow moulded container, moved in order to follow the movement of said subsequent blow moulded container, used to perform in-line leak testing of said subsequent blow moulded container and to generate an accept or non-accept signal said for the subsequent blow moulded container;
    said group of measuring heads further comprising at least one additional measuring head and being configured to:
        move in unison to simultaneously in-line test respective blow moulded containers of said sequence of blow moulded containers; and adapt a distance between two or more measuring heads of the group of measuring heads to gaps in the sequence of the blow moulded containers, said gaps being random gaps or block gaps that occur as a result of batch wise production of the sequence of the blow moulded containers produced by the blow moulding machine.

17. The device according to claim 16, wherein the at least one measuring head is connected to a source of pressurized gas by a connection wherein the connection can be opened and closed by an automatic valve.

18. A method for in-line leak testing of blow moulded containers in a leak-testing station comprising a conveyor line having an upstream end, a downstream end, a moving direction, and a group of measuring heads that are each individually movable vertically and horizontally, the method comprising:

feeding the conveyor line with a sequence of blow moulded containers from a blow moulding machine, wherein a first measuring head of the group of measuring heads is temporarily connected for pressure testing to a first blow moulded container, said first measuring head is moved in order to follow the movement of said first blow moulded container;

pressurizing said first blow moulded container by a source of pressurized gas whereafter the source of pressurized gas is disconnected;

measuring, with said first measuring head, a pressure decay in said first blow moulded container while following movement of said first blow moulded container;

comparing said measured pressure decay with stored data for the pressure decay of acceptable containers and generating an accept or non-accept signal;

after the measuring and while said first blow moulded container continues to move in the moving direction between the upstream end and the downstream end, releasing the temporary connection and moving the first measuring head against the moving direction of the conveyor line to a subsequent blow moulded container, wherein the first measuring head moves to the subsequent blow moulded container before the first blow moulded container reaches the downstream end; and adapting a distance between two or more measuring heads of the group of measuring heads to gaps in the sequence of blow moulded containers, said gaps being random gaps or block gaps that occur as a result of batch wise production of the sequence of the blow moulded containers produced by the blow moulding machine.

19. The method of claim 18, wherein the group of measuring heads are mounted for linear movement on a rail and are configured to move linearly between an entry point and an in-line testing location and back to the entry point.

* * * * *